Oct. 13, 1970　　　　W. B. GROSS　　　　3,533,715
BEATER PILOTING ARRANGEMENT FOR AN ELECTRIC FOOD MIXER
Filed July 31, 1968　　　　　　　　　　　2 Sheets-Sheet 1
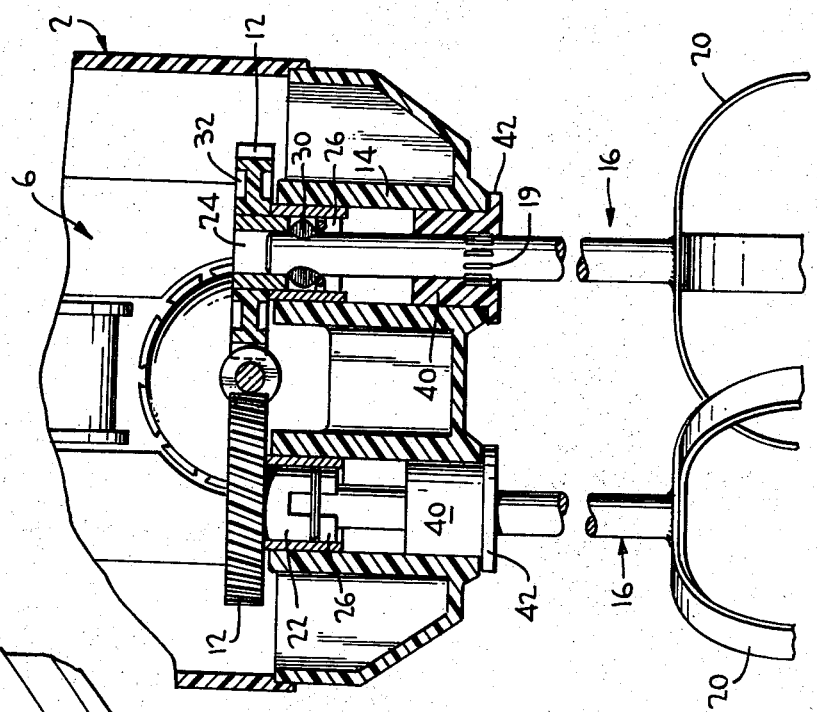
INVENTOR,
WAYNE B. GROSS
BY Jacobi & Davidson
ATTORNEYS

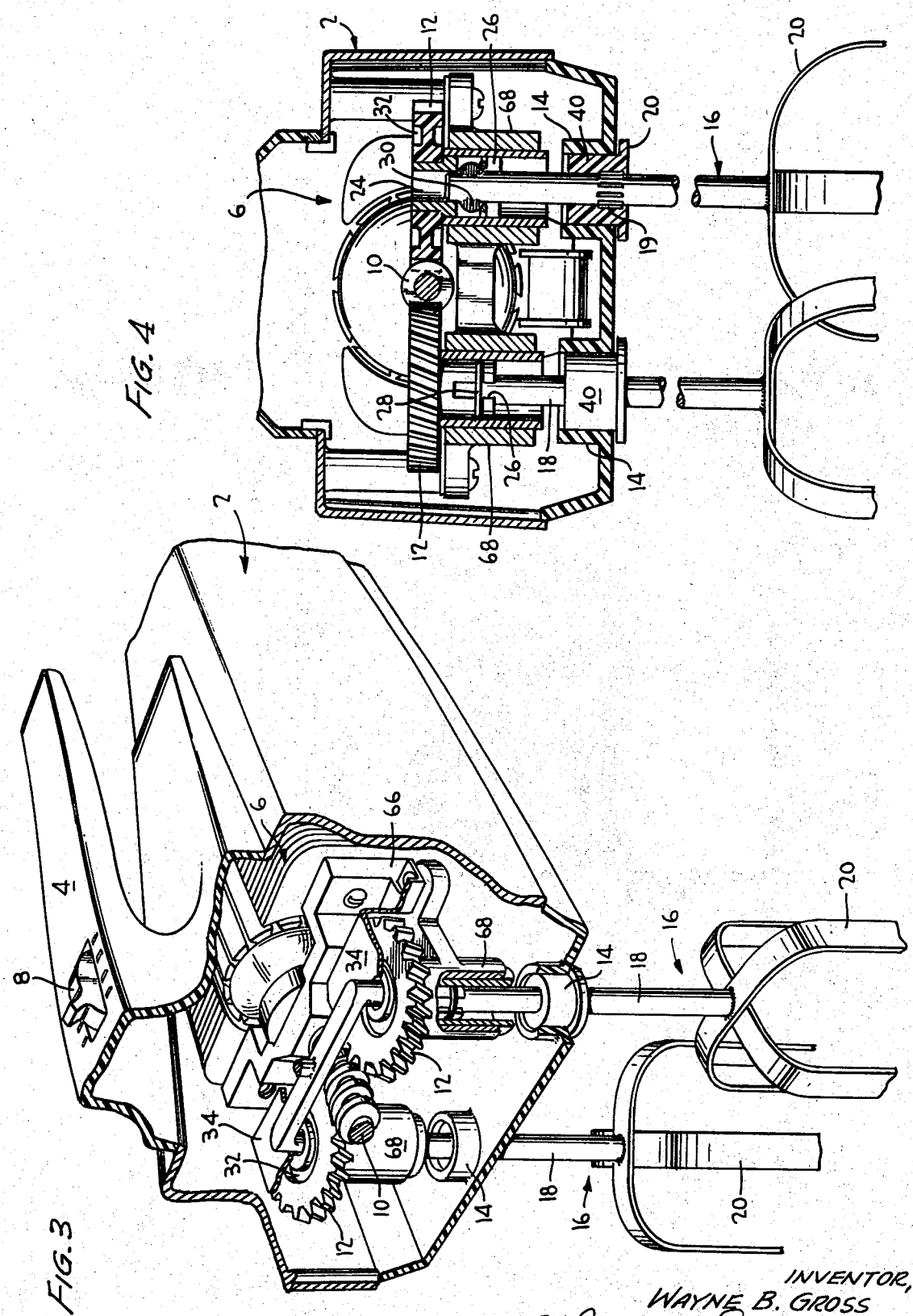

United States Patent Office 3,533,715
Patented Oct. 13, 1970

3,533,715
BEATER PILOTING ARRANGEMENT FOR
AN ELECTRIC FOOD MIXER
Wayne B. Gross, Glastonbury, Conn., assignor to Iona
Manufacturing Co., Inc., Manchester, Conn., a corporation of Connecticut
Filed July 31, 1968, Ser. No. 749,167
Int. Cl. A47j 43/08; F16c 17/00
U.S. Cl. 416—174                                11 Claims

ABSTRACT OF THE DISCLOSURE

There is disclosed an improvement in food mixers and beater elements used therewith. The improvement comprises the provision of at least two journalling locations for each beater element, the two journalling locations providing a beater piloting or guide arrangement wherein concentricity of the beater elements with respect to the mixer housing is maintained. In a preferred embodiment of the invention, the beater element is provided with a bushing member secured thereto, and the food mixer is constructed in such manner that the bushing member cooperates with the mixer housing so as to provide an additional beater piloting location.

---

This invention generally relates to food mixers and specifically concerns an improved beater piloting arrangement for an electric food mixer.

Electric food mixers, both of the portable hand-held variety and of the self-supporting type have received wide-spread acceptance by the public and have virtually become a standard kitchen accessory for the housewife. The extremely wide-spread distribution of such mixers into various parts of this country as well as foreign countries, the climatic and temperature variation found in these widely separated areas and the hard use to which the mixers are subjected have caused a number of problems relative to the construction of such food mixers. Certainly not the least of these problems is the difficulty in ensuring a relatively tight and concentric journalling of the beater mechanism or assembly in the housing of the electric food mixer under adverse climatic conditions due to expansion and contraction of the materials used in the journalling or piloting arrangement and the acculation of moisture therein, and after prolonged, normal use due to wear. Thus, prior art electric food mixers, normally constructed with a single journal location in the mixer housing for the beater shaft, oftentimes do not properly operate in areas having large climatic and temperature variations, changes in the fit of the beater shaft or assembly in the housing of the electric food mixer easily being brought about. Further, with only a single beater journalling location being provided, concentricity and proper fit of the beater shaft in the housing cannot easily be maintained.

Thus, there still remains a need in the home electric appliance art and particularly in the electric food mixer art for an improved beater piloting or journalling arrangement which assures proper journalling and proper fit of the beater mechanism or apparatus in the housing of the appliance, such proper journalling or fit being assured even under adverse temperature and climatic environments and with hard use.

It is a primary object of the subject invention, therefore, to provide an improved beater piloting arrangement which satisfies this need.

Further, though equally important objects of the subject invention are as follows:

(a) To provide an improved beater piloting arrangement which assures better concentricity and alignment of the rotating beater shaft in the appliance housing;

(b) To provide an improved beater piloting arrangement which is far simpler in construction than piloting arrangements of the prior art yet offers superior performance;

(c) To provide an improved beater arrangement which is relatively inexpensive to manufacture;

(d) To provide an improved beater piloting arrangement which substantially eliminates the complex bearing structures utilized in the prior art;

(e) To provide an improved beater piloting arrangement wherein a piloting or journalling bushing is carried on the beater shaft, the piloting or journalling bushing assuring proper alignment and journalling of the beater shaft in the housing.

In order to implement these and other objects of the subject invention which will become apparent as the description proceeds, the invention contemplates the provision of a novel beater piloting arrangement for journalling a beater mechanism or apparatus in the housing of the electric appliance. Specifically, a food mixer is depicted having a housing with at least one elongated bore associated therewith including inner and outer ends which define an opening communicating between the inside and outside of the housing. An electric motor is provided within the housing and serves to drive at least one spindle means or mechanism via a gear arrangement, the spindle means or mechanism being operatively associated with the elongated bore in the housing. In one preferred embodiment of the invention, the spindle means or mechanism extends into the elongated bore in the housing from the inner end thereof. Yet, in another preferred embodiment of the invention, the spindle means extends into a tubular sleeve formed on the frame of the electric motor, the tubular sleeve being supported above the inner end of the elongated bore in the housing and coaxial therewith.

The spindle means includes coupling means for releasably holding a beater shaft in coupled relationship therewith thus providing a first journal location for the beater shaft, the coupling means preferably comprising a plurality of vertical slots in the spindle means at one end thereof with a spring ring maintained in encircling relationship therewith.

An external beater is provided including a beater shaft of sufficient length to extend into the elongated bore associated with the housing from the outer end thereof and into engagement with the coupling means provided on the driven spindle means. The beater shaft, in a preferred arrangement, carries a bushing member thereon which, when the beater shaft is inserted into the housing, serves to journal the beater shaft in and relative to the outer end of the elongated bore in the housing to provide a second journal location for the beater shaft. Alternatively, the beater shaft itself without a bushing member may be directly journalled in and relative to the elongated bore in the housing.

The invention itself as well as other advantageous features thereof will become more readily apparent when reference is given to the following detailed description of preferred embodiments thereof, the detailed description referring to the appended drawing wherein:

FIG. 1 is a partially broken away perspective view of an electric food mixer incorporating a first embodiment of the novel beater piloting arrangement of the subject invention;

FIG. 2 is an end view of the electric food mixer assembly of FIG. 1 with the novel beater piloting arrangement being shown in enlarged cross-section for illustrative clarity;

FIG. 3 is a partially broken away perspective view of an electric mixer incorporating an alternative embodiment of the novel beater piloting arrangement of the subject invention; and, FIG. 4 is an end view of the electric food mixer assembly of FIG. 3, with the novel alternative embodiment of the beater piloting arrangement being shown in enlarged cross-section for illustrative clarity.

Turning now to the drawings, reference is made to both FIGS. 1 and 2 thereof wherein an electric food mixer incorporating a first preferred embodiment of the invention is depicted. The electric food mixer is provided with molded or extruded outer walls or wall means of plastic material which define a housing 2 and a handle 4. In a preferred construction of the invention, the outer walls may comprise a thermosetting resin such as phenoformaldehyde. Included within the housing 2 is an electric motor generally designated 6 energized by a non-illustrated electrical supply line and controlled through the operation of a disc switch 8 contained within the handle 4 in known manner.

The rotating shaft of the electric motor is formed as a worm 10 and serves to drive a pair of spaced apart gears 12 which, in this preferred embodiment, are respectively journalled in elongated bores 14 associated with an integral with the housing 2. Beaters generally designated 16 having shaft portions or beater shafts 18 and a beater mechanism 20 at one end thereof are provided, the beater shafts 18 being adapted to extend into the elongated bores 14 and into coupling and driven arrangement with the gears 12 in a manner to be described in more detail below. As will be apparent, the above-described general construction is such that when the electric motor 6 is energized and the worm 10 thereof caused to rotate, the respective gears 12 to either side of the worm 10 will likewise rotate and serve to rotate the respective beaters 16 to effect a mixing operation. In known manner, movement of the disc switch 8 serves to control the speed of operation of the electric motor 6.

Each of the gears 12 includes a spindle portion 22 preferably integrally attached thereto and extending partially into the elongated bore 14 from the inner end thereof. The gears 12 as well as the driven spindles 22 thereof can, if desired, be constructed of plastic material, although it is contemplated that, in some applications, the actual driven spindles 22 would be constructed of metal. In a preferred embodiment of the subject invention, gears 12 as well as the driven spindles 22 thereof are formed of nylon.

Each of the gears 12 and associated spindles 22 are preferably formed with a hollowed, elongated central portion coaxially arranged with respect to the elongated bore 14. The driven spindles 22 are constructed so as to exhibit coupling means for releasably holding a beater shaft in coupled relationship therewith, the coupling means, again in a preferred embodiment, comprising a plurality of vertically extending slots 26 with a spring ring 28 attached in circumferential relationship therewith. The shaft 18 of each beater 16 is adapted to be inserted into the elongated bore 14 from the outer end or outside thereof, the top end of the beater shaft 18 fitting within the hollowed out central portion 24 of each gear 12 and driven spindle 22. Splines 30 are constructed on the upper portion of each beater shaft 18 and slide into the vertical slots 26 on the driven spindles 22, snapping under the resilient circular spring ring 28. By virtue of the splines 30 extending through the vertical slots 26 and retained therein by the spring ring 28, the beater shafts 18 are thus driven, without slippage, by rotation of gears 12 and spindles 22 associated therewith.

Each of the gears 12 is preferably constructed to exhibit a groove 32 on the top surface thereof. A gear retaining plate 34 provided with an indentation 36 which rides within the grooves 32 on the surface of gears 12 is suitably coupled to the housing 2 and assures that the gears 12 and the spindles 22 associated therewith will remain within the elongated bore 14 during rotation thereof. The gear retaining plate 34 also is constructed to include a raised, L-shaped portion 37 having a hole therein in axial alignment with the bore through the gears 12 and the associated spindles 22. A beater release apparatus 38, preferably comprising a lever arrangement as shown extends from the handle 4 of the electric mixer and has two lower leg portions 40 and 42 respectively, which fit into the holes in the raised L-shaped portion or tab 37 of the gear retaining plate 34 and are held immediately above the top surface of each of the gears 12 in alignment with the central bore therein. In known fashion, when the beater release means 38 and particularly the tab portion thereof extending through the handle 4 of the mixer, is depressed, the bottom leg portions 40 and 42 will move downwardly into contact with the beater shaft 18 extending through the central bore within the gear 12 and slightly above the surface thereof. Continued downward movement of the beater release assembly or means 38 serves to disengage the beaters 16 from the housing 2 by causing the splines 30 on the beater shafts 18 to snap under and away from the resilient spring ring 28 and out of the vertical slots 26 on the driven spindles 22 to thus fall away from the housing. Spring means 41 are provided on bottom leg portion 40 abutting against the L-shaped portion 37 of the gear retaining plate 34 to effect a return of the beater release means.

Referring now to FIG. 2, a detailed construction of the preferred beater piloting assembly is depicted. A first or upper bearing surface or bushing is provided by the driven spindle 22 of gear 12 which extends partially into the elongated bore 14 and is journalled therein.

A second bushing 40 having a bottom flange or skirt portion 42 is preferably secured on and carried by the beater shaft 18. Bushing 40 preferably comprises a hollowed out cylinder, preferably constructed of a suitable synthetic resin, which includes but is not limited to a polycarbonate material, and is adapted to encircle and preferably frictionally engage with ribs or indentations 19 on the beater shaft 18, at a spaced distance from the top end of the beater shaft. Alternatively, the bushing 40 may be constructed of metal and be integrally formed with shaft 18. The spacing and dimensions of the bearing or bushing 40 on the beater shaft 18 is such that when the beater shaft 18 is inserted into the elongated bore 14 from the outer or outside opening thereof such that the splines 30 on the beater shaft 18 are engaged in the vertical slots 26 on the driven spindles 22, the bearing or bushing 40 on the beater shaft 18 will extend into the outer end of the elongated bore 14 associated with the housing. The bearing or bushing 40 carried on the shaft 18 thus serves to journal the beater shaft 18 in and with respect to the elongated bore 14. Accordingly, in accordance with the invention, two bearing locations or journalling points are seen to exist for the beater shaft 18, one of the journalling points being provided by the driven spindle 22 extending into the inner end of the elongated bore 14, the second journalling point being provided by the bearing or bushing 40 carried on the shaft 18 extending into the outer end of the elongated bore 14.

If desired, a second jouralling point for the beater shaft 18 could be provided without using a bushing 40. In this instance, the internal diameter of the elongated bore 14 could be reduced at the lower end thereof to that of the beater shaft itself. Non-illustrated slots would then be provided in the elongated bore 14 to allow clearance for the splines 30 on the beater shaft upon insertion of the beater shaft. In this manner, the beater shaft would be directly journalled in and with respect to the elongated bore 14 in the housing.

The utilization of the novel beater piloting or journalling arrangement of the instant invention produces a far superior journalling or fit of the beater assembly 16 in the housing 2 than heretofore known in the prior art. Since the beater shaft 18 is journalled at two spaced locations thereon, alignment of the shaft and the concentricity of its fit within the elongated bore 14 is assured even after long periods of use. Additionally, since the bearing or bushing 40 carried on the shaft 18 is preferably constructed of a non-hygroscopic material and one generally not affected by temperature changes, variations in temperature or climatic conditions will have little effect on the fit of the bearing or bushing 40 in the elongated bore 14. In any case, since only a single tolerance area between the bushing 40 and the elongated bore 14 exists, the problem of expansion and contraction of the bearing components is minimized.

The bearing or bushing 40 carried on the beater shaft 18 serves to seal the elongated bore 14 from the outside thereof by virtue of the flange or skirt portion 42 in addition to providing a journalling of the shaft 18. Further, through the utilization of the depicted structure, and particularly through the utilization of the two, spaced apart journalling locations, one journalling location being preferably provided by a bearing or bushing carried directly on the beater shaft itself, a minimal amount of material is required in the construction of the beater piloting arrangement thus reducing significantly the cost of manufacture of the finished appliance.

FIGS. 3 and 4 of the drawings depict an electric food mixer which incorporates a second or alternative preferred embodiment of the subject inventive beater piloting assembly. The electric food mixer of FIGS. 3 and 4 is constructed in a manner similar to the construction of the food mixer of FIGS. 1 and 2 and the components of the electric food mixer of FIGS. 3 and 4 that are similar to the components of the food mixer of FIGS. 1 and 2 are denoted by the same reference numerals. Thus, it is seen that the electric food mixer of FIGS. 3 and 4 is provided with molded or extruded outer walls or wall means which define a housing 2 and a handle 4. Included within the housing 2 is an electric motor generally designated 6 adapted to be energized by a non-illustrated electrical source of supply and controlled through the operation of the disc switch 8 contained within the handle 4. Greater detail of the electric motor generally designated 6 is disclosed in FIG. 3 as the electric motor 6 is adapted to be supported within the housing 2 from the top thereof. The electric motor 6 contains a worm 10 which serves to drive a pair of spaced apart gears 12 which, in this alternative preferred embodiment of the subject invention, are respectively journalled in elongated, hollow sleeves 68 integral with a die-cast frame 66 of the electric motor.

Each of the gears 12 contains a spindle portion 22 which is adapted to extend into and journal in the upper end of the elongated tubular sleeve 68 of the die-cast motor frame 66. The spindles 22 contain a coupling means preferably comprising a plurality of vertical slots 26 at one end thereof and an encircling resilient spring ring 28.

Elongated bores 14 defining an opening between the inside and outside of the housing 2 are again provided and are located in the bottom portion of the housing 2 directly beneath the elongated tubular sleeve 68 and in coaxial arrangement therewith. It is to be noted, however, that the length of the elongated bore 14 in the embodiment of the invention depicted in FIGS. 3 and 4 is considerably shorter than was the case with respect to the embodiment of FIGS. 1 and 2.

Beaters 16 are again provided, each beater containing a shaft portion 18 and a beater mechanism 20 as depicted, a bearing or bushing 40 again being preferably carried on the beater shaft 18 and held in place through the action of ribs or indentations 19 on the beater shaft 18 at a spaced distance from the top end of the beater shaft. Beater shaft 18 is adapted to be inserted through the elongated bore 14 in the housing 2 and through the elongated tubular sleeve 68 of the die-cast motor frame 66 dles 22. The bearing or bushing 40 on the beater shaft 18 will engage in the vertical slots 26 on the driven spindles 22. The bearing or bushing 40 on th beater shaft 18 will extend into the outer end of the elongated bore 14 associated with the housing as was the case with respect to the embodiment of FIGS. 1 and 2. Accordingly, the bearing or bushing 40 carried on the shaft 18 serves to journal the beater shaft 18 in and with respect to the elongated bore 14. Two bearing locations or journalling points for the beater shaft 18 are again provided, one of the journalling points being provided by the driven spindle 22 now extending into the upper end of the elongated tubular sleeve 68 of the motor frame 66, the other journalling point being provided by the bearing or bushing 40 carried on the shaft 18 extending into the outer end of the elongated bore 14. Accordingly, the same advantages described with respect to the embodiment of FIGS. 1 and 2 also apply with respect to this second or alternative preferred embodiment.

While the foregoing description has been directed to the use of the novel improved beater piloting arrangement in a food mixer, such description is not meant to limit the scope of the subject invention as it will be apparent to those skilled in the art that the invention can be incorporated in other appliances of similar type.

As should now be apparent, the objects initially set forth at the outset of the specification have been successfully achieved. Accordingly, what is claimed is:

1. In a food mixer, wall means defining a housing, said wall means having at least one elongated bore associated therewith including inner and outer ends defining an opening communicating between the inside and outside of said housing; at least one driven spindle means included within said housing, said spindle means being supported in axial alignment with said elongated bore, said spindle means including coupling means for releasably journalling a beater shaft in coupled relationship therewith; an external beater including a beater shaft of sufficient length to extend into said elongated bore from the outer end thereof and into engagement with said coupling means, and means for further journalling said beater shaft in and relative to the outer end of said elongated bore when said beater shaft is engaged with said coupling means.

2. A food mixed as defined in claim 1, wherein said beater shaft carries a bushing member thereon adapted to journal said beater shaft in and relative to the outer end of said elongated bore when said beater shaft is engaged with said coupling means.

3. A food mixer as defined in claim 2, wherein said bushing member carried on said beater shaft comprises a cylinder encircling said beater shaft, said cylinder fitting into the outer end of said elongated bore when said beater shaft is engaged with said coupling means.

4. A food fixer as defined in claim 2, wherein said spindle means extends partially into said elongated bore from the inner end thereof.

5. A food mixer as defind in claim 2, further including an electric motor within said housing for driving said spindle means, a frame for said electric motor, said frame including at least one elongated tubular sleeve disposed above and coaxial with said elongated bore, said spindle means extending partially into said tubular sleeve from the upper end thereof.

6. A food mixer as defined in claim 3, wherein said cylinder comprising said bushing member includes a skirt portion thereon adapted to substantially seal said elongated bore from the outside of said housing.

7. A food mixer as defined in claim 3, wherein said spindle means includes a hollow central portion and elongated slots on one end thereof, said beater shaft being adapted to extend into said hollow central portion of said spindle means, said beater shaft including splines on one end thereof adapted to engage within said elongated slots on said spindle means.

8. In a food mixer having a housing, an elongated bore extending through said housing, a drive means inside said housing associated with said elongated bore, and external beater means including a shaft insertable into said elongated bore into operative relation with said drive means, the improvement comprising:

bushing means carried on said beater shaft adapted to journal said beater shaft in said elongated bore.

9. The improvement defined in claim 8, wherein said bushing means comprises a synthetic resin cylinder engaged with an encircling said beater shaft.

10. The improvement defined in claim 9 wherein said cylinder has a skirt portion around one end thereof.

11. The improvement defined in claim 9, wherein said cylinder comprises a polycarbonate material.

References Cited

UNITED STATES PATENTS

| 2,515,755 | 7/1950 | Krause | 259—1 |
| 3,279,265 | 10/1966 | Braun et al. | 259—1 X |
| 3,333,825 | 8/1967 | Wolter et al. | 259—1 |

FOREIGN PATENTS

| 973,005 | 1/1964 | Great Britain. |

WILLIAM I. PRICE, Primary Examiner

U.S. Cl. X.R.

259—1